(No Model.)

J. D. PATTERSON.
COTTON CHOPPER AND CULTIVATOR.

No. 252,510. Patented Jan. 17, 1882.

WITNESSES:
Chas. Nida
C. Sedgwick

INVENTOR:
J. D. Patterson
BY Munn & Co.
ATTORNEYS.

UNITED STATES PATENT OFFICE.

JAMES D. PATTERSON, OF COMPETITION, MISSOURI.

COTTON CHOPPER AND CULTIVATOR.

SPECIFICATION forming part of Letters Patent No. 252,510, dated January 17, 1882.

Application filed June 14, 1881. (No model.)

*To all whom it may concern:*

Be it known that I, JAMES D. PATTERSON, of Competition, in the county of Laclede and State of Missouri, have invented certain useful Improvements in Cotton Choppers and Cultivators, of which the following is a specification.

Figure 1:
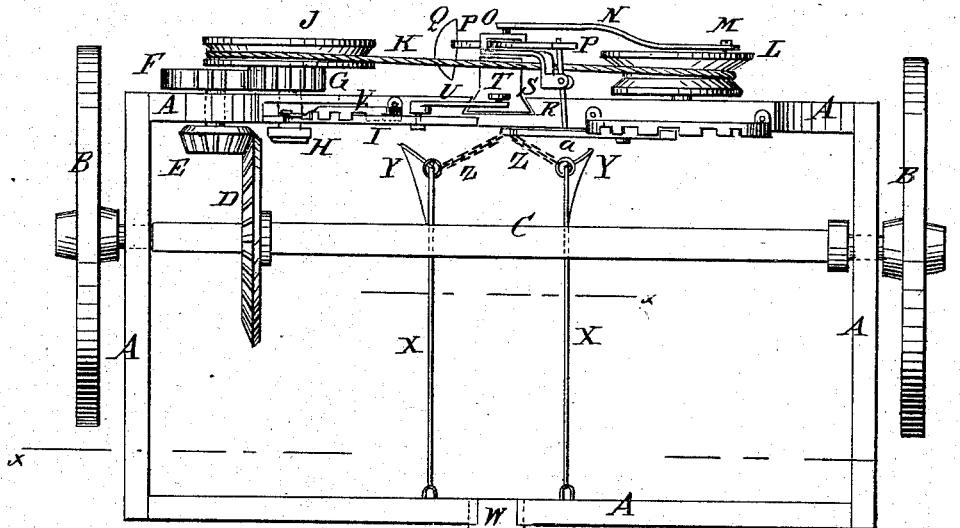
Figure 2:
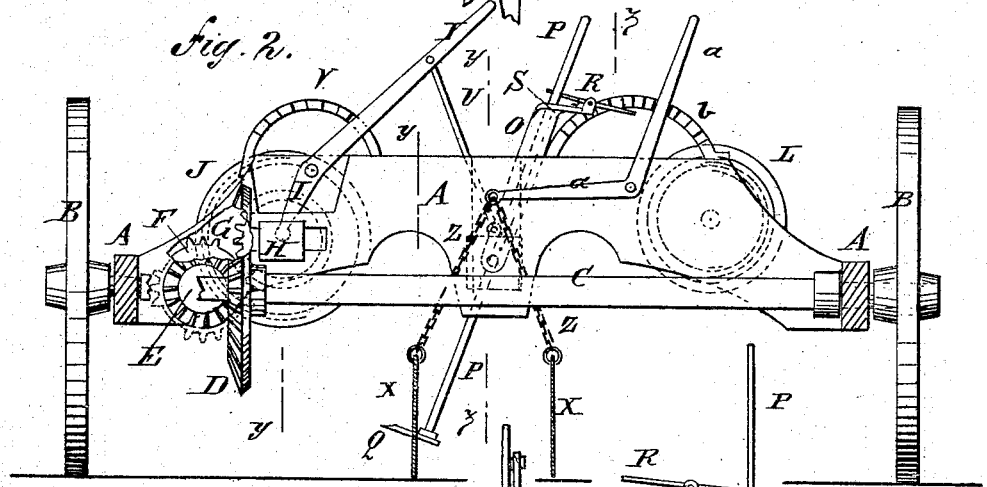
Figures 3, 4:
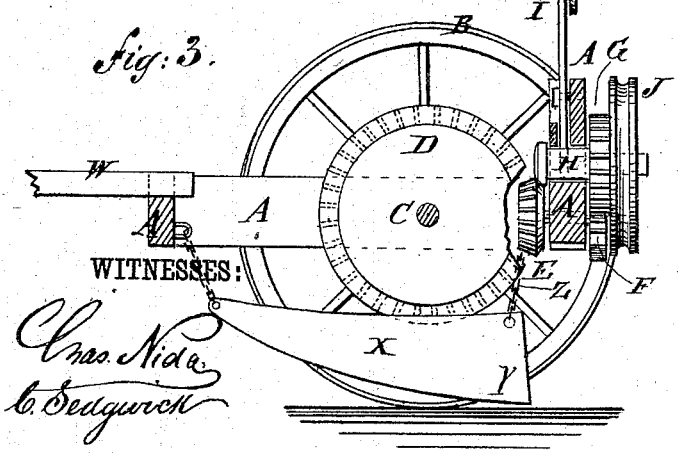

Figure 1 is a plan view of my improvement. Fig. 2 is a sectional front elevation of the same, taken through the broken line $x\,x\,x$, Fig. 1. Fig. 3 is a sectional side elevation of the same, taken through the broken line $y\,y\,y$, Fig. 2. Fig. 4 is a sectional side elevation of a part of the same, taken through the broken line $z\,z$, Fig. 2.

The object of this invention is to facilitate the cultivation of cotton.

A represents the frame of the machine, which consists of two side bars connected at their ends by cross-bars. The rear cross bar of the frame A is made wide, and is arranged in a vertical position to adapt it to receive the operating mechanism.

B are the wheels, the axle C of which revolves in bearings attached to the side bars of the frame A, a little in the rear of their centers.

To the axle C is attached a beveled-gear wheel, D, the teeth of which mesh into the teeth of a beveled-gear wheel, E, journaled to the rear cross-bar of the frame A.

To the rear end of the journal of the beveled-gear wheel E is attached a gear-wheel, F, the teeth of which are arranged in segments or sections at equal distances apart. The teeth of the gear-wheel F mesh into the teeth of a gear-wheel, G, journaled to a block, H, which slides in a horizontal slot in the rear cross-bar of the frame A, so that the gear-wheel G can be thrown into and out of gear by moving the said block H. To the block H is pivoted the lower end of a lever, I, which is pivoted to the upper part of the rear cross-bar of the frame A. The upper end of the lever I projects into such a position that it can be readily reached and operated by the driver from his seat, which is designed to be secured to supports attached to the frame A, and which is not shown in the drawings.

To the journal of the gear-wheel G, or to the said gear-wheel, is attached a pulley, J, around which passes a band, K. The band K also passes around a pulley, L, journaled to the rear cross-bar of the frame A, near its other end.

To the pulley L is attached a crank-pin, M, to which is pivoted the end of a connecting-rod, N. The other end of the connecting rod N is pivoted to the upper part of a socket or keeper, O, through which passes a rod or bar, P.

To the lower end of the rod P is attached the hoe or chopping-blade Q, which is made of a length equal to the space required to be cut away between the hills of plants. The rod P and hoe Q are supported in the socket O by a lever, R, pivoted to an arm or bracket, S, formed upon or attached to the upper end of the said socket O. The other end of the lever R projects into such a position that it can be readily reached and operated by the driver from his seat when it is desired to prevent the hoe from operating without stopping its driving mechanism. The lower end of the socket O is pivoted to a block, T, which slides in a vertical groove or slot in the rear cross-bar of the frame A.

To the sliding block T is pivoted the lower end of a connecting-rod, U, the upper end of which is pivoted to the upper part of the lever I, so that the movements of the said lever I that throw the gear-wheel G into and out of gear with the gear-wheel F to start and stop the vibrations of the hoe Q will also lower the said hoe into and raise it from a working position. The lever I is held in any position into which it may be adjusted by an arched catch-bar, V, attached to the rear cross-bar of the frame A.

To the center of the forward cross-bar of the frame A is attached the tongue W, to which the draft is applied.

To the forward cross-bar of the frame A, upon the opposite sides of and equally distant from its center, are pivoted, or with it are connected, the forward ends of two plates, X, the lower edges of which are curved, in the manner of runners, as shown in Fig. 3, and the rear lower corners, Y, of the plates X are bent outward, as shown in Fig. 1.

To the rear upper corners of the plates X Y are attached the lower ends of two short chains, Z, the upper ends of which are attached to the lower end of a bent lever, $a$. The lever $a$ is pivoted at its angle to the rear cross-bar of the frame A, and its upper end projects into such a position that it can be readily reached and operated by the driver from his seat to raise the plates X from the ground when desired. The lever a is held in any position into which it may be adjusted by an arched catch-bar, b, attached to the rear cross-bar of the frame A. These plates are to be forced into the ground by the feet of the operator to bar off the plants, and their construction permits of their passing over any rubbish, and thus prevent the rubbish being dragged along and the plants being torn down thereby.

Having thus fully described my invention, I claim as new and desire to secure by Letters Patent—

1. The combination, with the hoe Q, of the rod P, supported by lever R, the socket O, the rod N, the pulley L, having crank-pin M, the band K, the pulley J, and gear-wheels G F E D, whereby said hoe is operated from the drive-shaft, as described.

2. The combination of the socket O, hoe P Q, lever R, bracket S, sliding block T, lever I, and connecting-rod U with the vertically-grooved cross-bar A and mechanism for vibrating said socket, substantially as and for the purpose set forth.

3. The combination, with the bar P, carrying the hoe Q, of the vibrating socket O, provided with the bracket S, and the lever R, pivoted to the said bracket, substantially as and for the purpose set forth.

4. The combination, with the slotted and grooved cross-bar A, the gear-wheels D E F, and the socket O, of the gear-wheel G, the block H, the lever I, the rod U, and the block T, substantially as and for the purpose set forth.

5. The combination, with the bar P, carrying the hoe Q, of the socket O, provided with the lever R, pivoted to the bracket S on the said socket, and mechanism for vibrating said socket, substantially as and for the purpose set forth.

JAMES DANIEL PATTERSON.

Witnesses:
BENJAMIN R. CLONTS,
JAMES B. FERGUSON.